Oct. 7, 1941.　　　W. M. SCOTT, JR　　　2,258,150
CIRCUIT-CONTROLLING APPARATUS
Filed Aug. 27, 1938　　　10 Sheets-Sheet 1

*INVENTOR.*
WILLIAM M. SCOTT, JR.

Cornelius L. Ehret
*ATTORNEY.*

Oct. 7, 1941.  W. M. SCOTT, JR  2,258,150
CIRCUIT-CONTROLLING APPARATUS
Filed Aug. 27, 1938  10 Sheets-Sheet 3

INVENTOR.
WILLIAM M. SCOTT, JR.

Cornelius L. Ehret
ATTORNEY.

Oct. 7, 1941.  W. M. SCOTT, JR  2,258,150
CIRCUIT-CONTROLLING APPARATUS
Filed Aug. 27, 1938   10 Sheets-Sheet 4

INVENTOR.
WILLIAM M. SCOTT, JR.
ATTORNEY.

Oct. 7, 1941.   W. M. SCOTT, JR   2,258,150
CIRCUIT-CONTROLLING APPARATUS
Filed Aug. 27, 1938   10 Sheets-Sheet 5
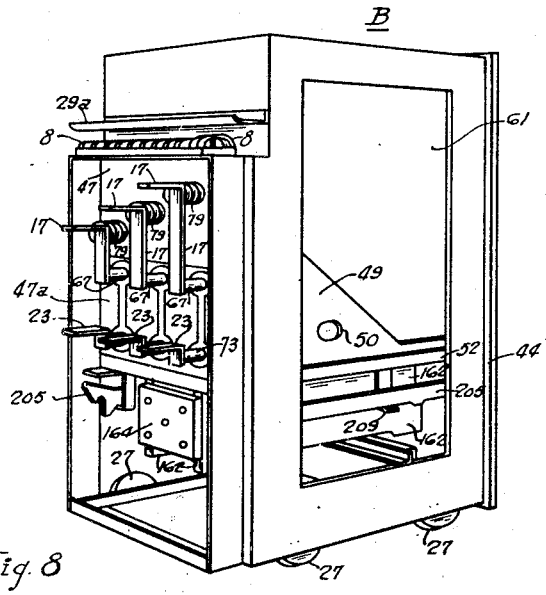
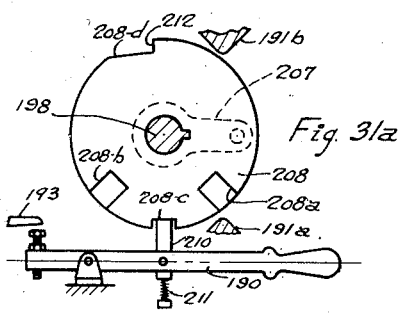
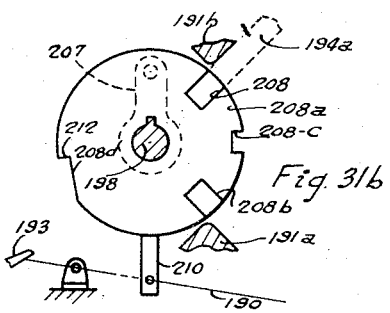
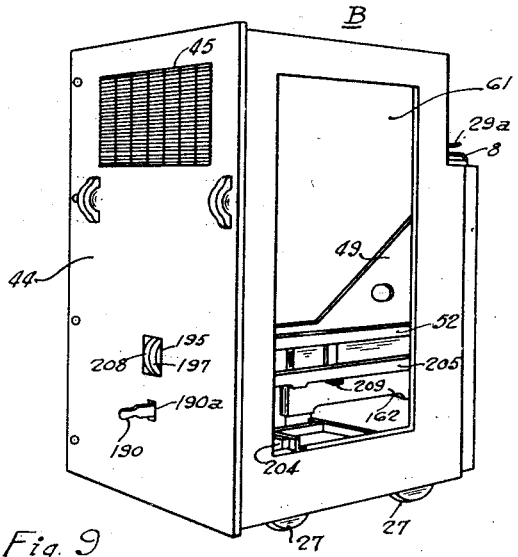
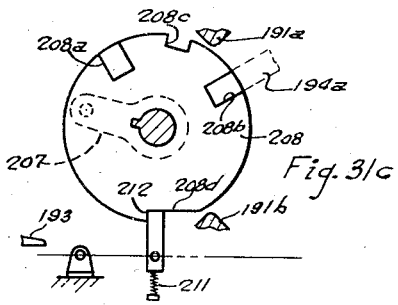
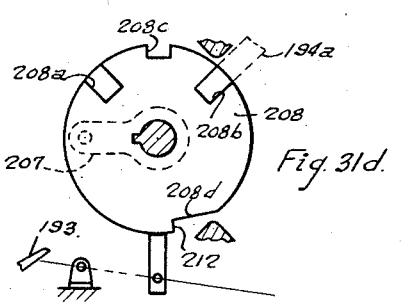
INVENTOR.
WILLIAM M. SCOTT, JR.
ATTORNEY.

Oct. 7, 1941.   W. M. SCOTT, JR   2,258,150
CIRCUIT-CONTROLLING APPARATUS
Filed Aug. 27, 1938   10 Sheets-Sheet 6

INVENTOR.
WILLIAM M. SCOTT, JR.

Cornelius D. Ehret
ATTORNEY.

Oct. 7, 1941.　　　W. M. SCOTT, JR　　　2,258,150
CIRCUIT-CONTROLLING APPARATUS
Filed Aug. 27, 1938　　　10 Sheets-Sheet 7
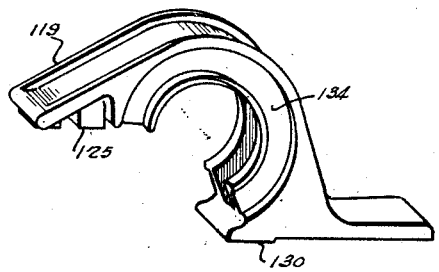
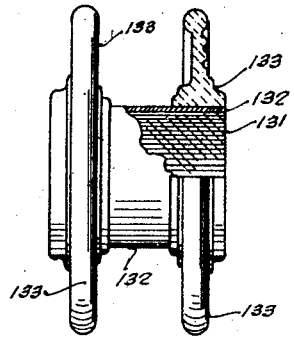
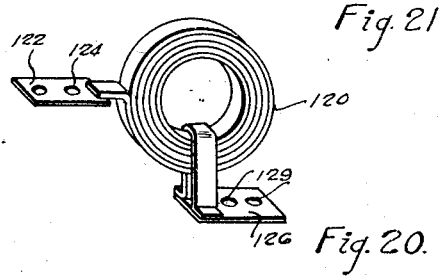
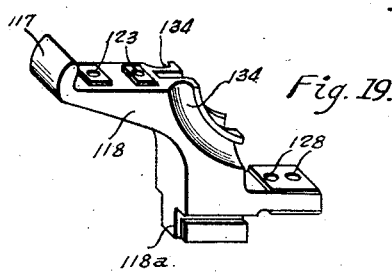
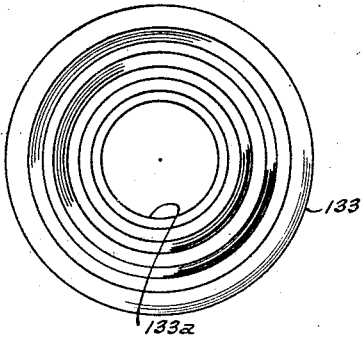
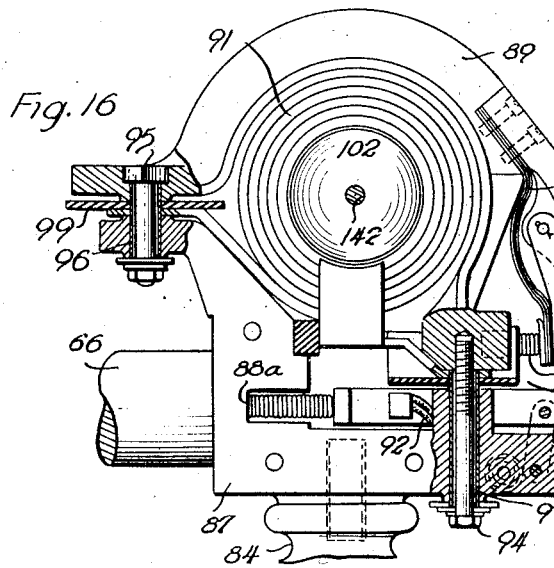
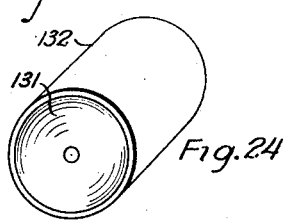
INVENTOR.
WILLIAM M. SCOTT, JR.
ATTORNEY.

Oct. 7, 1941.     W. M. SCOTT, JR     2,258,150
CIRCUIT-CONTROLLING APPARATUS
Filed Aug. 27, 1938     10 Sheets-Sheet 8

INVENTOR.
WILLIAM M. SCOTT, JR.
ATTORNEY.

Oct. 7, 1941.   W. M. SCOTT, JR   2,258,150
CIRCUIT-CONTROLLING APPARATUS
Filed Aug. 27, 1938   10 Sheets-Sheet 9

INVENTOR.
WILLIAM M. SCOTT, JR.
ATTORNEY.

Oct. 7, 1941.  W. M. SCOTT, JR  2,258,150
CIRCUIT-CONTROLLING APPARATUS
Filed Aug. 27, 1938   10 Sheets-Sheet 10

INVENTOR.
WILLIAM M. SCOTT, JR.

ATTORNEY.

Patented Oct. 7, 1941

2,258,150

UNITED STATES PATENT OFFICE 2,258,150

CIRCUIT-CONTROLLING APPARATUS

William M. Scott, Jr., Bryn Mawr, Pa., assignor to I-T-E Circuit Breaker Company, Philadelphia, Pa., a corporation of New Jersey Application August 27, 1938, Serial No. 227,089

22 Claims. (Cl. 200—168)

My invention relates to circuit-controlling apparatus, and particularly to circuit breakers, of the type provided with disconnect contacts to permit withdrawal from a switchboard or equivalent.

In accordance with one aspect of my invention, circuit-breaker structure is supported from a vertical wall or panel of a frame by conductors which extend through the wall and on the other side thereof provide a mounting for the disconnect contacts, and the operating mechanism for the movable contact structure is mounted on the under side of a horizontal wall or panel of the frame through which extends an insulated operating member; more particularly, the frame with the aforesaid parts mounted thereon is removable as a unit from a truck, or other supporting structure, the aforesaid vertical wall or panel serving as part of the rear wall of the truck and the aforesaid horizontal wall or panel dividing the truck into an upper compartment containing the contact structure of the circuit breaker and a lower compartment containing the operating mechanism of the circuit breaker.

Further in accordance with my invention as applied to multi-pole circuit breakers, there is provided an interpole barrier assembly removable as a unit from the truck or equivalent housing for the circuit breaker and comprising panels of insulating material which cooperate when the assembly is in place with sheet-insulating material comprising or lining the aforesaid vertical and horizontal walls of the circuit-breaker framework to define separate compartments for each pole of the breaker.

My invention further resides in the features of construction, combination and arrangement hereinafter described and claimed.

Aspects of my invention herein disclosed but not claimed are claimed in divisional applications Serial Nos. 251,500, 331,507 and 331,697.

For an understanding of my invention, reference is to be had to the accompanying drawings in which:

Figs. 8 and 9 are rear and front perspective views of the truck unit of Fig. 4 (Sheet 5);

Figure 4:
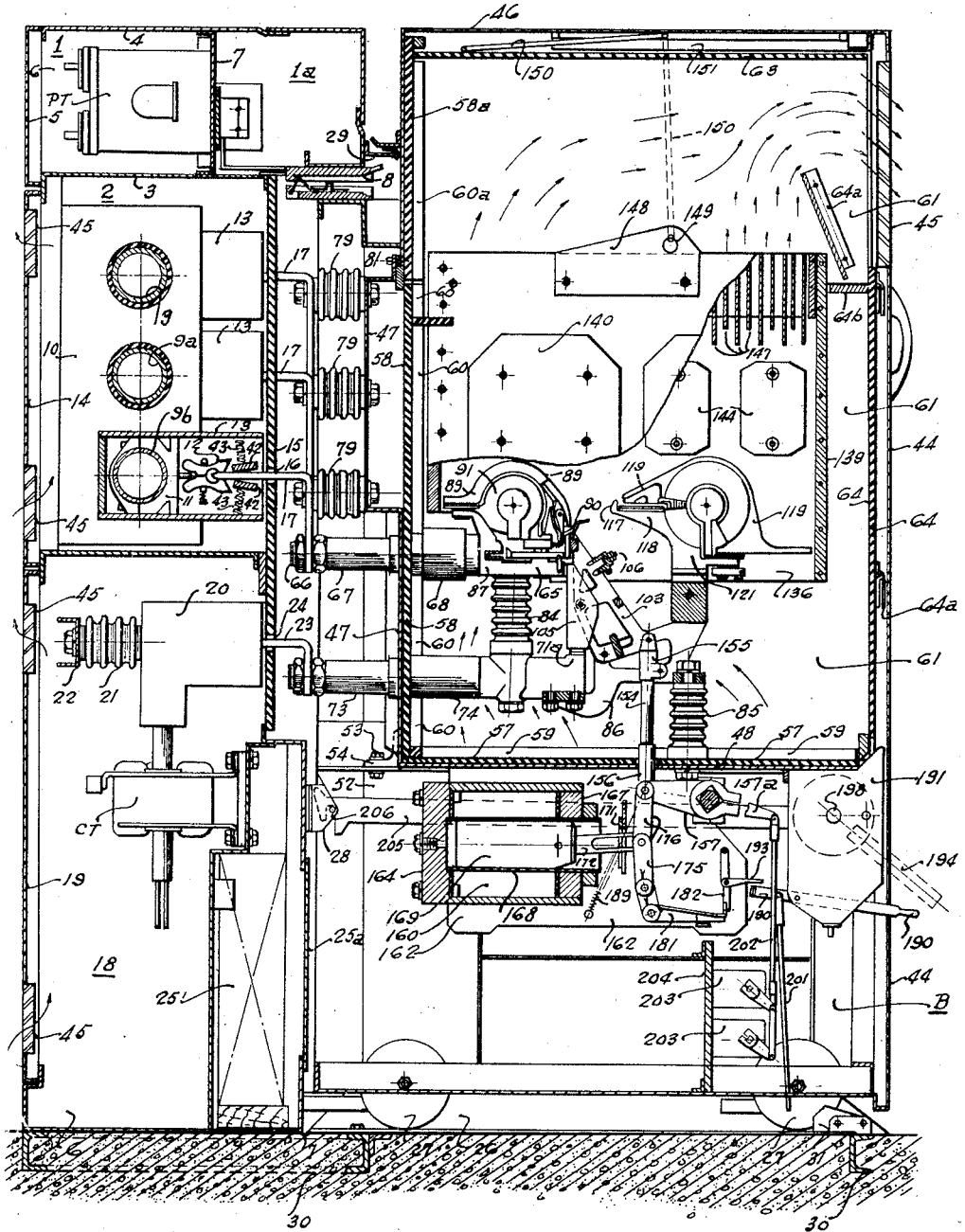
Fig. 4 is a side view in section of one of the truck units of Fig. 1 and of its associated switchboard unit (Sheet 2)
Figure 13:
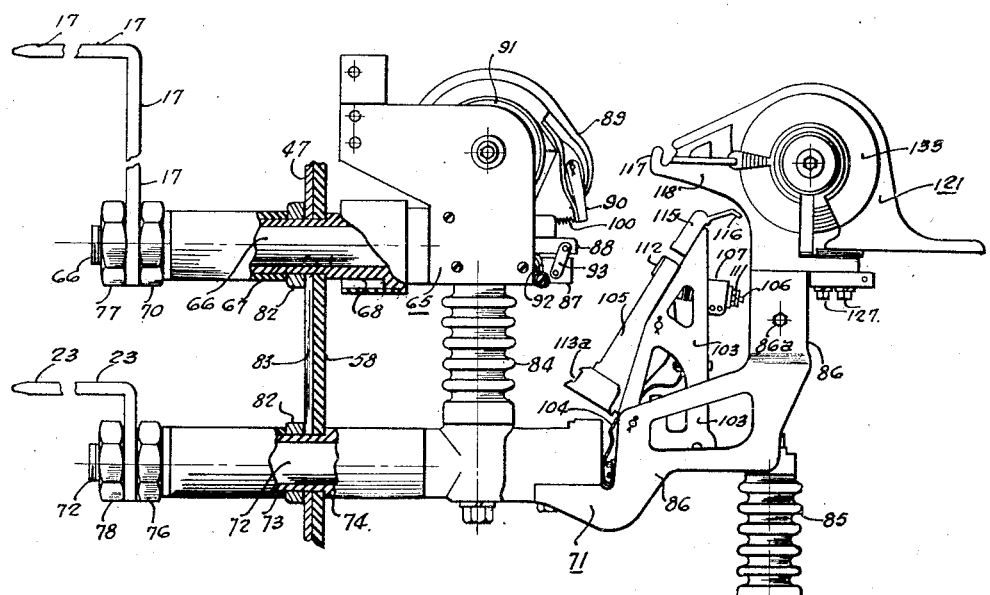
Fig. 13 is a detail view in side elevation of the contact structure of the circuit breaker of Fig. 4 (Sheet 3)
Figure 15:
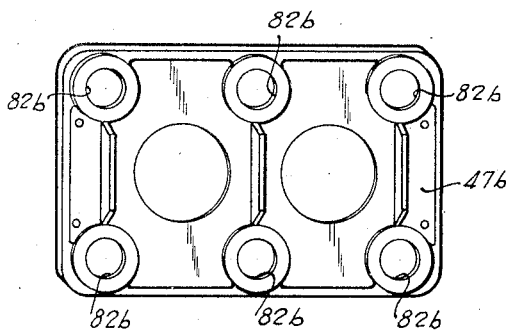
Figures 10, 30:
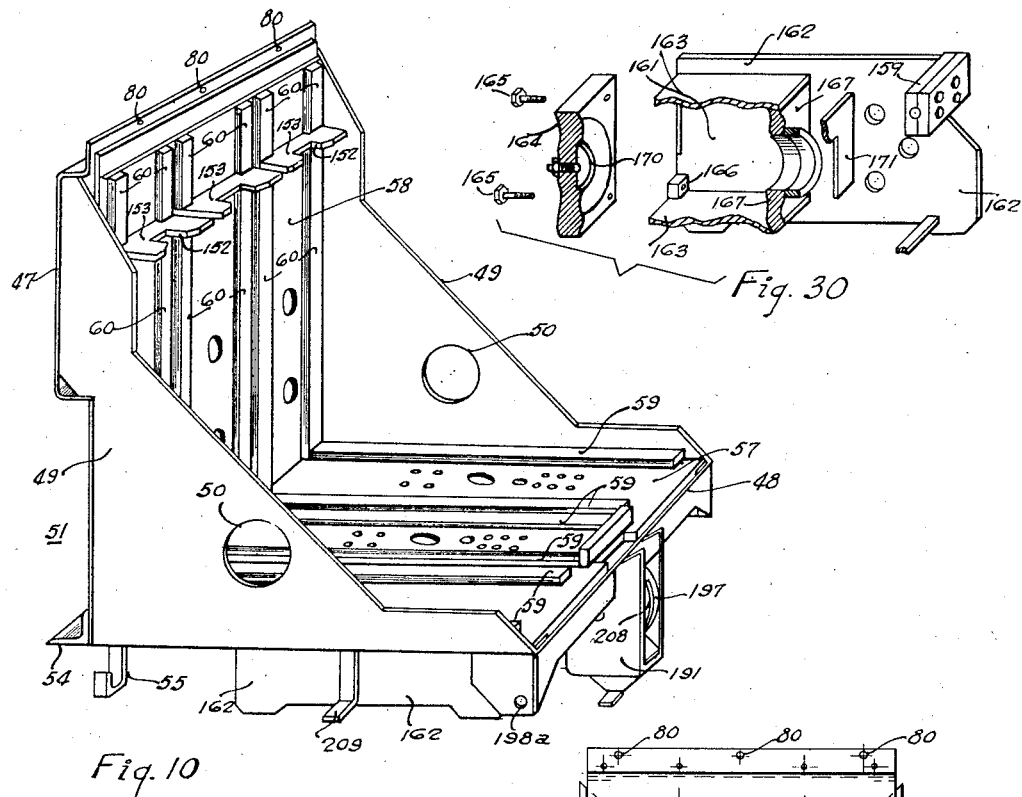
Fig. 10 is a perspective view on enlarged scale of the frame of the circuit-breaker unit of Fig. 4 (Sheet 6)
Figure 17:
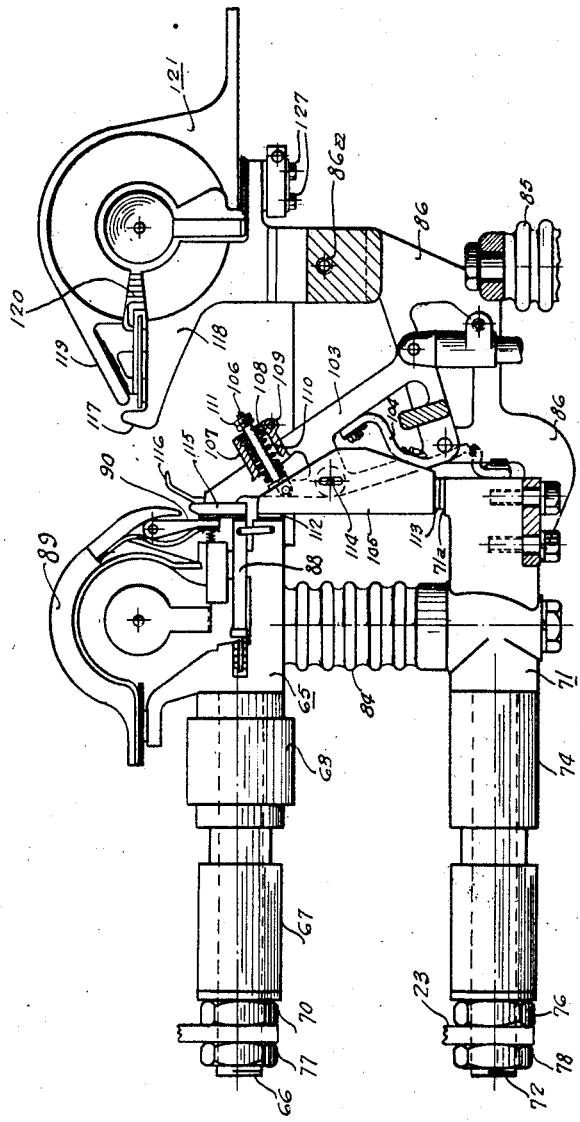
Figure 18:
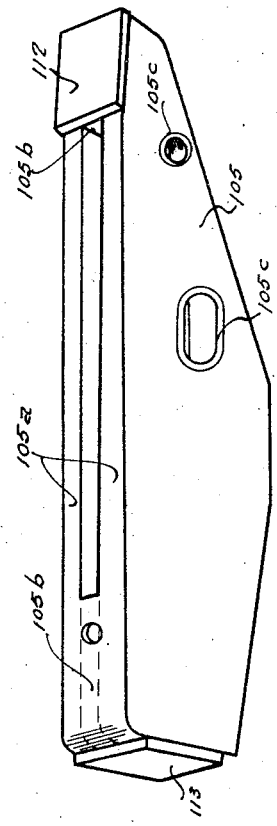
Figure 26:
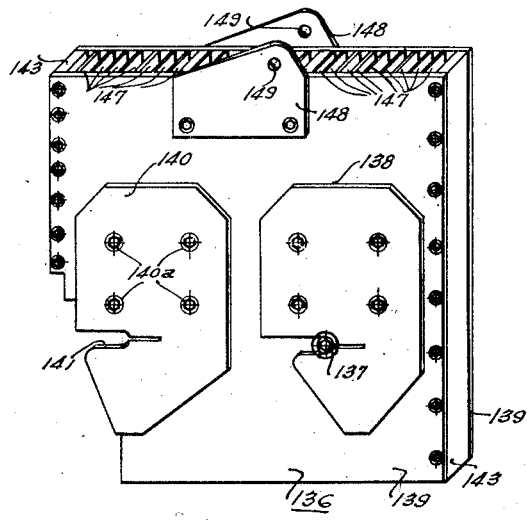
Figures 27, 28:
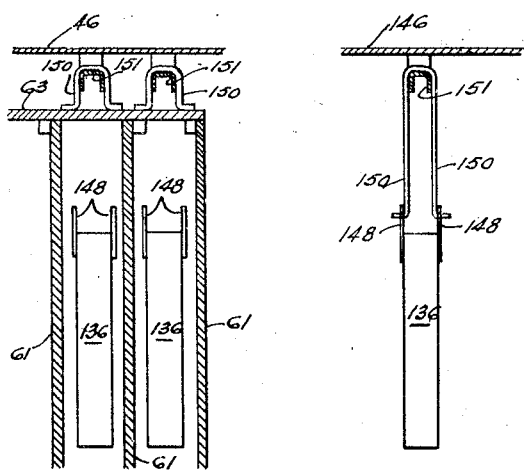
Figure 25:
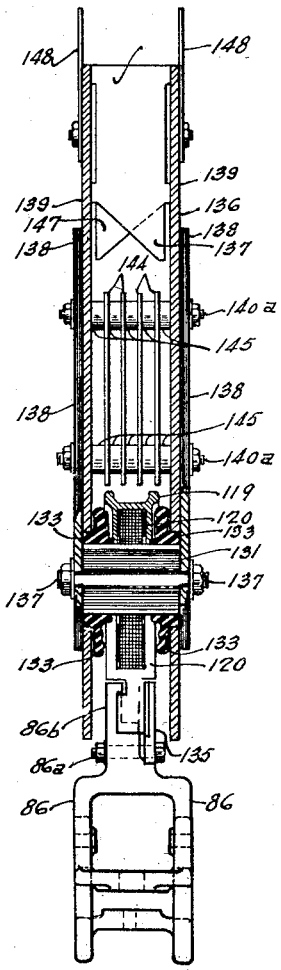
Figure 29:
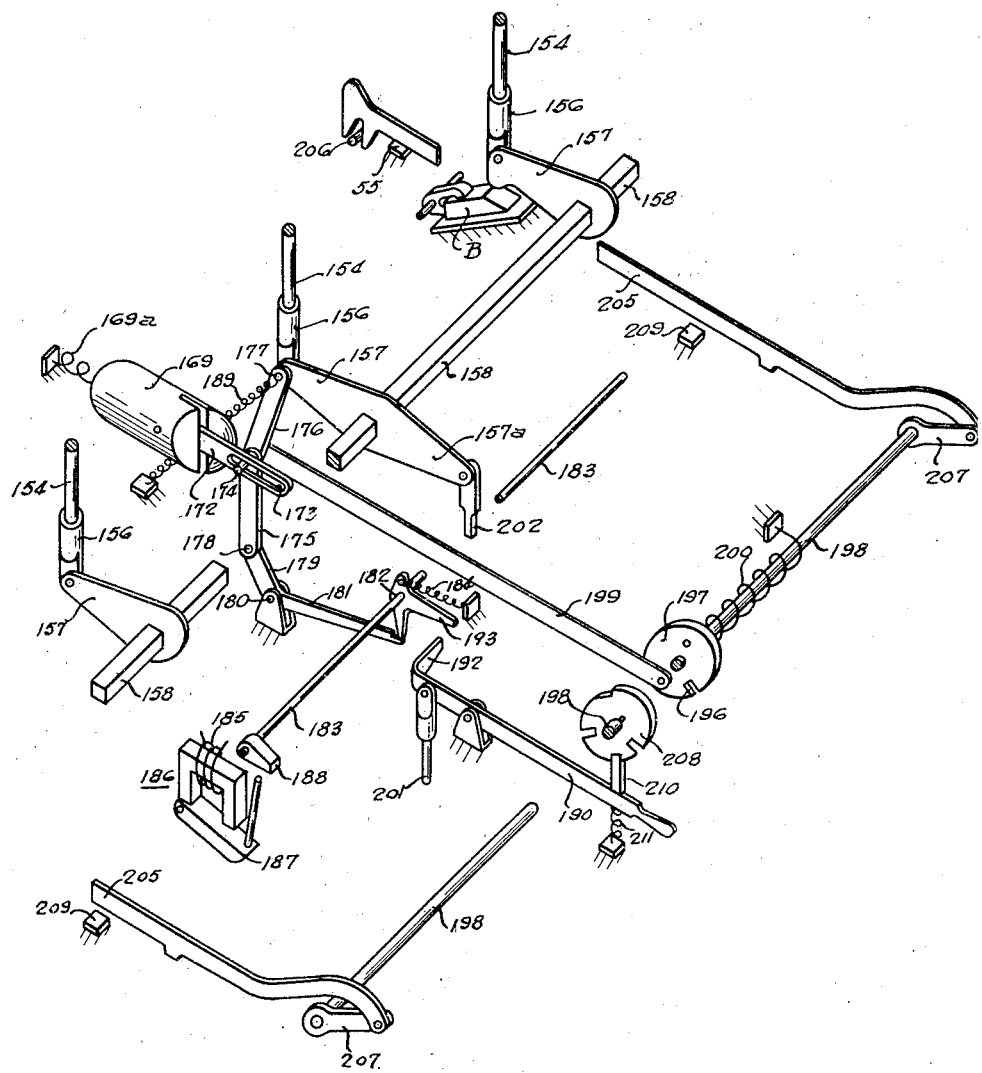

Fig. 15 discloses a modified back plate for the frame of Fig. 10 (Sheet 4);

Fig. 16 is a side elevational view, partly in section, and on enlarged scale of a blowout and contact assembly shown in Fig. 4 (Sheet 7);

Fig. 17 is similar to Fig. 13 but with the contacts in open-circuit position and with some elements broken away (Sheet 8);

Fig. 18 is a perspective of a contact element shown in Fig. 17 (Sheet 8);

Figs. 19 to 21 are perspective views of the components of a blowout assembly shown in Fig. 17 (Sheet 9);

Fig. 22 is a front elevational view, with parts broken away, showing the relation of some parts of a blowout assembly shown in Fig. 17 (Sheet 9);

Fig. 23 is a side elevational view of an insulator shown in Fig. 22 (Sheet 9);

Fig. 24 is a perspective view of the core member shown in Fig. 22 (Sheet 9);

Fig. 25 is a sectional view of an arc chute and blowout assembly shown in Fig. 4 (Sheet 10);

Fig. 26 is a perspective view of the arc chute of Fig. 25 (Sheet 10);

Figs. 27 and 28 are explanatory figures referred to in the specification in description of removal of the arc chutes (Sheet 10);

Fig. 29, in perspective, illustrates the essential elements of circuit-breaker operating mechanism and the truck racking gear (Sheet 11);

Fig. 30 is a perspective view of parts of electromagnetic operating mechanism shown in Fig. 4 (Sheet 6);

Figs. 31a-d illustrate different positions of elements of Fig. 29 referred to in explanation of the interlocking relations of the racking gear and the tripping mechanism.

Figure 1:
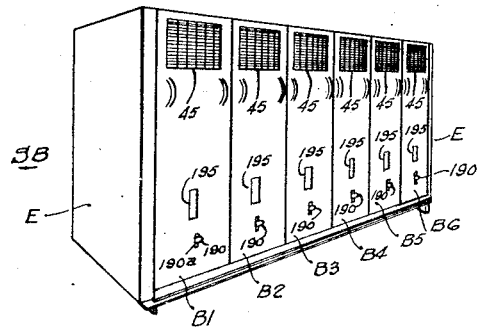
Fig. 1 is a front perspective view of a switchboard with a plurality of truck type circuit breakers in service position (Sheet 1)

Referring to Fig. 1, the switchboard SB is a rectangular metal-clad structure containing bus bars, cable connections, and one or more truck or withdrawal type circuit breakers B1—B6. The stationary structure S, Figs. 2 and 3, of the switchboard comprises units S1—S6, corresponding in number with the circuit breakers, suitably mounted in alignment with each other.

The ends E, E of the switchboard are suitably reinforced steel panels attached to the end units S1, S6 and are substantially wider than the side panels of the units. Each of the units S1—S6 consists of three compartments vertically aligned, individually covered with removable steel panels, and separated or sealed by horizontal steel barriers. Since all units are, or may be similar in construction, only one of them need be described. Referring to Fig. 4, the uppermost compartments 1 and 1a, of a unit S, exemplary of any of units S1—S6, are sealed from the next lower compartment 2 by the horizontal steel barrier 3; the upper wall 4 of the compartments 1, 1a is a steel plate forming the top of the unit; the rear wall of the compartment 1 is the removable steel cover plate 5; and the sides of the compartment 1 are formed by side plates 6 extending from top to bottom of the unit. The steel partition 7 isolates the two compartments 1 and 1a from each other.

The upper compartments 1, 1a contain auxiliary apparatus such as potential transformers PT, relays, and wiring from control and signal contacts 8 which are suitably mounted on the under side of that portion of the bottom of compartment or duct 1a which projects beyond the front wall of compartment 2. Other auxiliary apparatus as meters M, control switches and the like, may be mounted upon the rear face (Fig. 4) of panel 5 for observation or operation from the rear of the switchboard.

Within the compartment 2 are supported the three bus conductors 9, 9a, 9b each wrapped in phenolic insulation, molded and cured in position and clamped in the impregnated maple blocks 10, 10a (Fig. 2) to withstand short-circuit stresses. To each tubular bus is directly attached a support 11 for disconnect contacts 12 whose purpose and construction are hereinafter described. Each of the disconnect contact assemblies for a bus conductor is enclosed in its individual housing 13 of insulating material. The rear wall of compartment 2 comprises the removable metal panel 14 and the front wall thereof comprises the upper part of the panel 15, of insulating material and in which there are three staggered slots 16 for permitting contacts 17 extending from the rear of the circuit-breaker unit B to pass through the panel into the similarly staggered disconnect housings 13. Thus, when the unit B is withdrawn, it is impossible for an attendant accidentally to touch any uninsulated parts at high potential.

The bottom compartment 18 of the unit S, whose rear face is closed by the removable steel panel 19, contains cable disconnect contacts, suitably encased in insulating housings 20, current transformers CT, and the outgoing cable connections therefrom. The housings 20 are supported, as by insulators 21 from the cross brace 22, in alignment to receive the contacts 23 which pass through slots 24 in the lower part of panel 15 from the rear of the breaker unit B. The duct 25 along the front face of compartment 18 may be used to encase the wires from the transformers CT to a protective relay or electromagnet hereinafter identified. Access to the interior of duct 25 may be had by removal of the steel panel 25a.

Extending from the front of each unit (S1—S6) are the rails 26 for guiding the wheels 27 of its associated circuit breaker unit (B1—B6), a pair of lugs 28 whose purpose will hereinafter be described, and a dust shield member 29 for the auxiliary contacts 8. The rails 26 extend upwardly from the steel base 30 from which also extends the tripping cam 31 whose purpose will hereinafter appear.

The steel base 30, comprising plates and structural members, extends the length of the switchboard and forms a foundation to which the units are secured.

Figure 5:
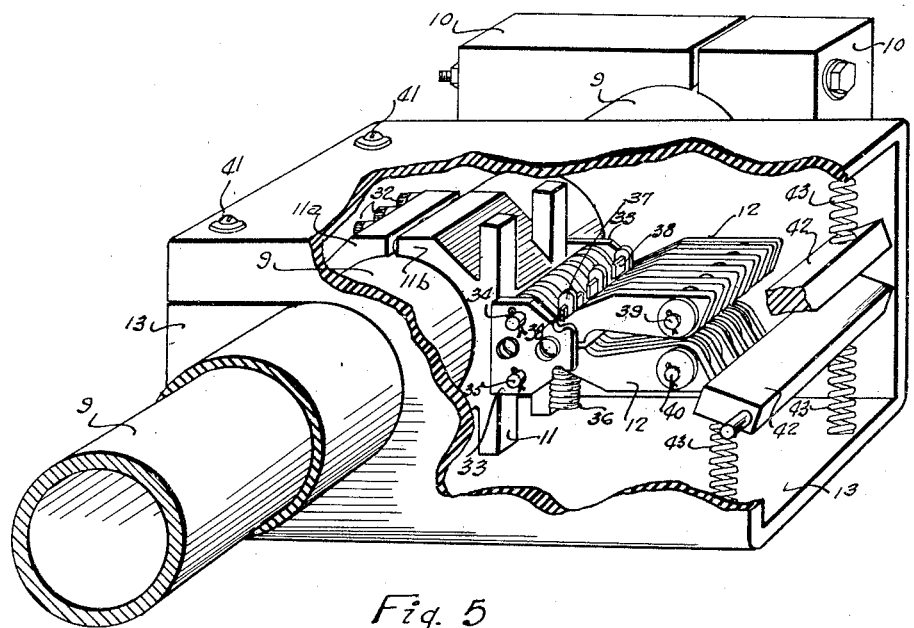
Fig. 5 is a perspective view on enlarged scale and with parts broken away of a disconnect arrangement shown in Fig. 4 (Sheet 3)

Reverting to the arrangement providing for disengageable connection of the bus conductors with disconnect contacts 17 of the circuit-breaker unit B, the support 11 for the bus disconnect contacts 12 comprises two members 11a, 11b (Fig. 5) of metal which are clamped by bolts 32 directly to the bus conductor 9. From the front of member 11b extend the brackets 33 for supporting the pins 34, 35 upon which the upper and lower contacts 12 are respectively pivotally mounted. The upper and lower contacts 12 of each of the several groups shown in Fig. 5 are biased toward each other by a spring 36 which encircles a bar 37 through which loosely extend two yoke members.

The upper equalizing yoke 38 presses downwardly on the upper face of two adjacent upper contacts 12; a similar yoke (not shown) bears against the under faces of the corresponding pair of lower contacts 12. The pin 39 passes loosely through forward ends of all of the upper contacts 12 and similarly pin 40 passes loosely through the forward ends of all of the lower contacts 12. This contact construction, more fully described in United States Letters Patent #2,029,028 to Kneass et al., insures equal distribution of the contact pressure between contacts 12 and 17 notwithstanding their appreciable misalignment.

The housing 13 which is assembled about the bus disconnect structure after the latter has been clamped to the bus conductor comprises two separable parts held together as by screws 41. Across the open front end of the housing extend two pivotally mounted shutters 42 of insulating material biased toward engagement with each other by springs 43. The gap between the forward edges of the shutters is in alignment with the corresponding slot 16, Fig. 4, in the panel 15. When the circuit-breaker unit B is pushed into position, each of the disconnect contacts 17 enters its corresponding slot 16, separates a pair of shutters 42, and slides between the upper and lower disconnect contacts 12. When the unit B is completely withdrawn, the shutters 42, 42 within each housing 13 close the corresponding panel slot 16 and preclude accidental contact with the disconnect contacts 12.

Figure 2:
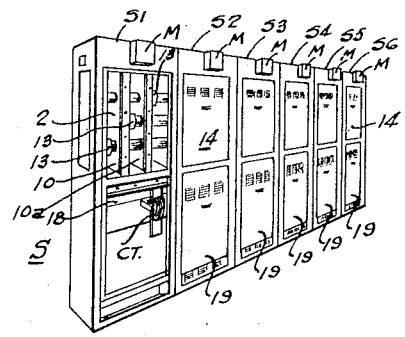
Fig. 2 is a perspective view of the rear of the switchboard of Fig. 1 with some of its panels removed (Sheet 1)
Figure 3:
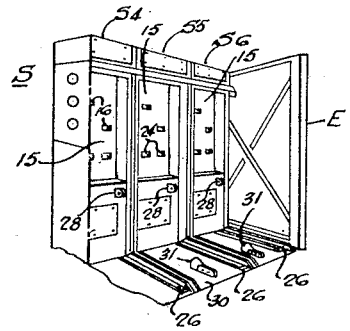
Fig. 3 is a perspective of part of the switchboard of Fig. 1 with the truck units completely withdrawn and not shown (Sheet 1)
Figure 6:
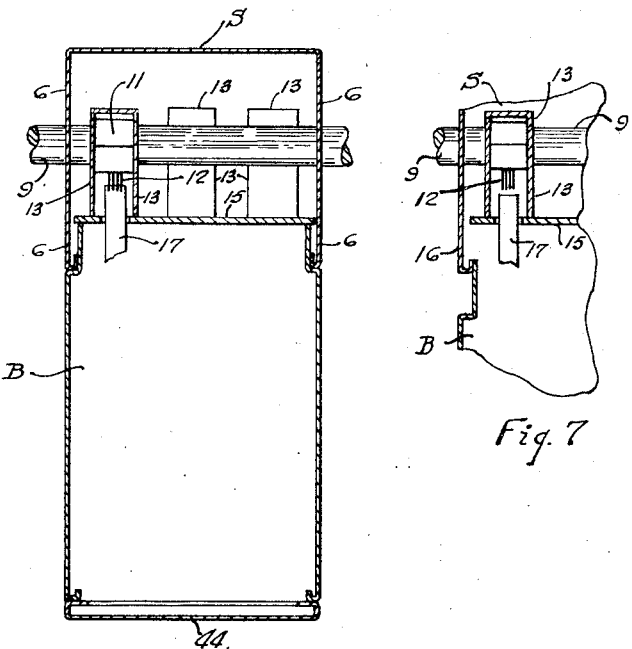
Figs. 6 and 7 are plan views in section illustrative of the relative positions of the truck and switchboard units when their disconnect contacts are engaged—Fig. 6—and disengaged—Fig. 7 (Sheet 4)
Figure 7:
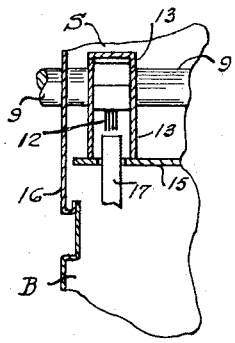

As more apparent from Fig. 2, the bus conductors and live parts connected thereto are completely insulated and effectively isolated from each other. The bus conductors, as previously stated, are encased in insulation except within the insulating housings 13, and each disconnect contact assembly is within its individual housing 13 of insulation. When panel 14 is opened, there is, therefore, no possibility of accidental contact with any of the live parts within compartment 2. Moreover, as shown in Figs. 6 and 7, the sides 6, 6 of the unit S so far overlap the sides of the circuit-breaker unit B that it is not possible for an attendant to touch the contacts 17 until after the unit B has been so far withdrawn from the switchboard that contacts 17 are out of engagement with the live disconnect contacts 12.

Each of the truck units B1—B6, exemplified by unit B, Figs. 4, 8 and 9, is a substantially rectangular structure formed by angle iron and sheet steel suitably joined as by welding. The door 44 which permits access to the circuit-breaker mechanism hereinafter described is provided near the top with a louvered opening 45 to permit escape of gases incident to circuit interruption and allow circulation of air for cooling. In the particular construction shown in Figs. 4, 8 and 9, the top of the truck structure is closed by a sheet metal wall 46.

The circuit breaker and its operating mechanism is removable as a unit from the rear of the truck structure. The framework 51 of the unit, shown in Fig. 10, comprises a sheet-steel and angle iron structure having a vertical wall 47 and a horizontal wall 48 connected and braced by gusset plates 49 having therein holes 50 to receive crane hooks. Holes 50 are approximately in line with the center of the gravity of the unit to facilitate its manipulation while suspended from a crane.

When the unit is in position, its wall 47 serves as the lower part of the rear wall of the upper or circuit-breaker compartment of the truck; the upper part of the rear wall of the truck compartment is an integral part of the truck structure.

The frame 51 is slidable along and supported by the angle irons 52 extending across the sides of the truck and is held in position by bolts 53 (Fig. 4) which pass through the angle pieces 54 projecting rearwardly from the rear wall 47 of the frame 51. The brackets 55 serve to guide racking links hereinafter described.

The upper face of the horizontal panel 48 and the front face of the vertical wall 47 are covered or lined with the panels 57, 58 of insulating material. The strips 59 of insulating material projecting upwardly from panel 57, and similar strips 60 extending forwardly from panel 58 form slots for receiving the bottom and rear edges of the panels 61 of an interpole barrier unit 62, Fig. 11. The rear wall of the truck is internally faced with a panel 58a of insulation which is, in effect, a continuation of panel 58 and from it project the strips 60a of insulation which are, in effect, continuations of the strips 60. The top of the unit 62 is closed by panel 63 which, like panels 61, is of insulating material. The front of interpole barrier unit 62 is closed by panel 64 of insulating material from the bottom thereof to a level somewhat below that of louver 45 (Fig. 4) leaving the upper, forward parts of the isolated compartments formed by the panels 61, 64, 57 and 58 open for discharge of arc gases. Preferably, short horizontal ledges 64b project inwardly of the compartments from or adjacent the upper edge of panel 64 to prevent the arc gases from flowing downwardly and adjacent the parts of the circuit breaker, and within each compartment above the ledge 64b is fastened the arc gas deflector plate 64a, also of insulation.

The interpole barrier unit 62 is removable from the front of truck structure B by opening door 44 and pulling the barrier unit 62 forward in the slots provided by guides 59. Handles 64c may be provided to facilitate the withdrawal.

Figure 12:
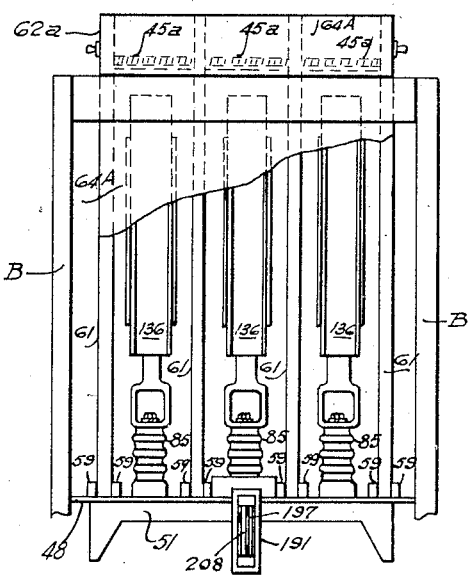
Fig. 12 is a front elevation with parts broken away of an alternate form of interpole barrier in place (Sheet 4)

In a modification shown in Fig. 12, the top panel 46 of the truck is omitted, and the interpole barrier unit 62a withdrawn and inserted through the opening thus afforded. In this modification, the top of the interpole barrier unit is left open and the front panel 64A thereof extends from top to bottom. The metal grills 45a within and near the top of each compartment formed by panels 61, 57 and 58 serve to chill the arc gases.

The circuit breaker shown herein is a three-pole breaker but since the construction of all three poles are similar, only one need be described. Referring to Figs. 4, 13 and 17, the upper main contact assembly 65 comprises a stud 66 which passes through the sleeves 67, 68 of insulating material. By tightening nut 70 on stud 66, the two sleeves 67, 68 are forced tightly against opposite sides of the vertical wall 47 of frame 51. Similarly, the lower main contact assembly 71 is mounted upon a stud 72 which passes through sleeves 73, 74 of insulating material. By tightening nut 76, the sleeves 73, 74 are clamped to opposite sides of the rear vertical wall of the frame 51.

The disconnect contacts 17, 23 are held to the studs 66, 72 by the nuts 77, 78, respectively. The upper end of each of the disconnect contacts 17 is braced by an insulator 79, Fig. 8, to resist bending during insertion and withdrawal of the circuit-breaker unit B from the switchboard. The insulators 79 are secured to and project horizontally from the rear face of the upper part of the steel wall 47 of frame 51.

Preferably, the portion of wall 47 which supports insulators 79 lies in a plane farther to the rear than the plane of that portion of the wall from which the studs 66, 72 extend. The uppermost portion of wall 47 is provided with a series of holes 80, Fig. 10, through which pass screws 81, Fig. 4, for securing it to the rear face of the truck. These screws, as well as screws 53, are removed for withdrawal of the frame 51 on which all of the contact structure and operating mechanism therefor is mounted.

Figures 11, 14:
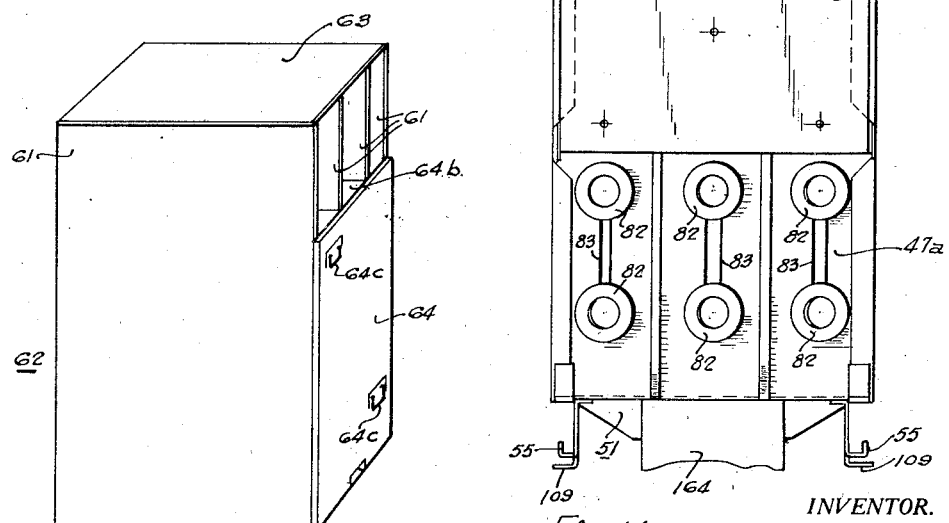
Fig. 11 is a perspective view of an interpole barrier (Sheet 6)
Fig. 14 is a rear view of the frame shown in Fig. 10 (Fig. 6)

Reverting to the mounting of the contact assemblies 65 and 71, two alternative arrangements are shown. In Fig. 14, the steel plate 47a is provided with rings 82 of brass or other non-magnetic material brazed to plate 47a and whose openings fit the inner insulating sleeves 67, 73, shown in Fig. 13. Between each pair of rings 82, the plate 47a is provided with a slot 83 to eliminate or minimize eddy currents. For plate 47a may be substituted the plate or casting 47b, Fig. 15, entirely of bronze or other suitable non-magnetic material provided with openings 82b which fit the insulating sleeves 67, 73.

The main contact assemblies 65 and 71 are mechanically interconnected by the insulator 84 which resists forces, due to flow of heavy currents, tending to move assemblies away from each other. The insulator 85 mechanically connected to the frame member 86 of assembly 71 and to the base plate 48 of the unit frame 51 stiffens or supports the assembly 71 against forces or shocks incident to the opening and closing movements of the parts of the circuit breaker.

The upper main contact assembly, Figs. 4, 13 and 16, comprises the main contact member 87, the auxiliary contact member 88, the arcing horn 89, the arcing tip 90, and blowout coil 91. The auxiliary contact 88 is biased to the position shown in Fig. 13 by a spring 88a and connected by pigtail 92 to the main contact. A pair of links 93 on opposite sides of contacts 87, 88 support and guide the latter during its movement.

The arcing horn 89 is mechanically connected to the main contact 87 by bolts 94, 95, Fig. 16, which pass through sleeves 96, 97 of insulating material and clamp the front and rear ends of the horn against the plates 98, 99 of insulating material. It is necessary to anchor both ends of the horn to prevent its deformation when the blowout coil is traversed by heavy short-circuit currents. The arcing tip 90 is supported from the rear face of the forward end of horn 89 and biased toward engagement with the end of the horn by spring 100. During tripping of the breaker, this biasing force is supplemented by the effect of the electromagnetic field produced by current through the tip 90 and the contact 115 hereinafter described. Pigtail 101 connects the movable arc horn tip 90 to the horn 89 to divert most of the current from its pivot. The current flowing in this pigtail forces the shunt contact toward engagement with its complementary contact.

One end of the blowout coil 91 wound upon core 102 is held in electrical connection with main contact 87 by the bolt 95 and the other terminal of the coil is held in electrical connection with the arcing horn structure by the bolt 94. Electrical connection of the horn 89 with contact 87 except through the blowout coil is precluded by sleeves 96, 97 and plates 98, 99. The coil is wound from heavy flat wire or ribbon covered with insulation resistant to the effects of high temperatures.

The lower main contact assembly 71, Figs. 4, 13 and 17, comprises the stationary frame member 86 within which is pivotally mounted the movable frame member 103 connected by pigtail 104 to the stationary frame member and to the bridging contact member 105 loosely pivotally mounted in the movable frame member 103. The contact member 105 is made of two side pieces 105a of copper sheet spaced by and welded to the blocks 105b; the holes through the member for the pivot pins connecting it to the frame 103 and the rod 106 are preferably bushed with hardened steel bushings 105c. The rod 106 (Fig. 17) pivotally connected to the bridging contact member 105 near the upper end thereof passes through the split tubular structure 107 and through the plug 108 threaded into the outer end thereof. Bolts 109 may be tightened to clamp the split housing 107 upon the plug 108 and so hold it in the position affording the desired compression of spring 110 disposed between plug 108 and a shoulder on the rod 106. The nuts 111 on the free end of rod 106 serve as a stop limiting the extent of its forward movement when the circuit breaker is open.

The upper contact piece 112 of the bridging contact member 105, Figs. 17 and 18, engages the upper main contact 87 in a vertical plane and the lower contact piece 113 engages the lower main contact 71a in a horizontal plane. During closure of the circuit breaker, the contact 112 engages contact 88 and causes member 105 to pivot about pin 114 to effect wiping engagement between the lower movable contact 113 and stationary contact 71a. The engagement of these lower contacts and continued movement of frame 103 causes member 105 to move upwardly and insure wiping engagement between the upper contact 112 and the stationary contact 88. When the circuit breaker is fully closed, the spring 110 exerts a force having one component acting horizontally to determine the contact pressure between the upper contacts 112, 88 and another component acting at right angles thereto to determine the contact pressure between the lower contacts 113 and 71a. This construction is in general similar to but an improvement of that disclosed and claimed in my copending application Serial #151,359.

Preferably, a dust shield 113a, Fig. 13, is attached to the bridging member 105 partially to enclose the lower contact 113.

To the upper end of movable frame member 103 is attached the arcing contact 115 which, when the circuit breaker is closed (Figs. 4 and 17), engages both the auxiliary or shunt contact 88 and the movable arcing horn tip 90. Preferably contacts 115, 88 and 90 are of "Elkonite" or similar arc-resistant material. When the circuit breaker is tripped the contact 115, in moving to its fully open position, Fig. 13, separates from the auxiliary contact 88 thus to include the blowout coil 91 in circuit. Shortly after separation of contact 115 from the horn tip 90, the arc extends from the horn 89 to arcing tip 116 of the movable arc contact 115 until the tip 116 moves sufficiently close to the tip 117 of a second, stationary arcing horn 118 connected by bolt 86a to the frame 86 and at the same potential as tip 116. When the arc transfers from the tip 117 to the upper arcing horn 119, a second blowout coil 120 is included in circuit further to force the arc upwardly in the arc chute hereinafter described and further to separate the terminals of the arc.

The construction of the front blowout assembly 121 comprising the upper and lower arcing horns 118, 119 and coil 120 is more clearly understood from Figs. 19 to 25. When the upper horn 119, Fig. 21, and the lower horn, Fig. 19, are in their assembled position, they provide a housing or casing for the blowout coil 120 (Fig. 25) one terminal 122 of which is held in electrical contact with the upper horn 119 by bolts, not shown, which pass through insulating sleeves and washers, through holes 123 in the lower horn 118, and holes 124 in terminal 122 to thread into the under face of block 125 integral with the upper horn 119. Similarly, the other terminal 126 of the blowout coil 120 is held in electrical contact with the lower horn 118 by bolts 127, Fig. 17, which pass through insulating sleeves and washers, holes 128 in the lower horn 118, and holes 129 in coil terminal 126 to thread into the under face of projection 130 of the upper horn 119.

The core 131 for the blowout coil is preferably formed by winding a strip of thin sheet iron to form a cylinder received by a tube 132 of insulating material. The outer diameter of tube 132 corresponds with the diameter of the holes 133a through the insulators 133 received by annular recesses 134 in the sides of the upper and lower horn assembly. The inner faces of the insulators, Fig. 25, are out of contact with and appreciably spaced from the arcing horns except adjacent the core. The front blowout assembly is held to frame 86 by bolt 86a which holds the extension 118a of the lower horn between the clamping plate 135 (Fig. 25) and the extension 86b of the frame.

In the preferred arrangement shown, the front blowout assembly is removable as a unit with the arc-chute assembly 136 (Figs. 4, 25 and 26). The bolt 137 which passes through the core 131 of the blowout coil 120 clamps it against the pole pieces 138 held against the outside faces of the side panels 139 of the arc chute. Soft rubber gaskets between the inner ends of the insulators and horn members reduce and distribute the mechanical strain on the insulators sufficiently to avoid breakage. The pole pieces 140, which may be laminated, for the rear blowout coil 91 are also held, as by bolts 140a, against the outside faces of the side panels. The slots 141 in the rear pole pieces 140 are suited to receive the bolt 142 which passes through the core 102 of the rear blowout coil. By loosening the nuts on bolts 142, 86a, the arc chute and front blowout assembly may be slid forwardly from the circuit-breaker contact structure and out of the truck through its door 44.

The side panels 139 and end panels 143 of the arc chute are of suitable insulating material; for example, the sides 139 may be of sheet asbestos and the ends 143 of fibre or the like. Within the arc chute above the arcing horns are four groups of spaced plates 144 of insulating material, for example fibre, which serve to split the arc lengthwise as it rises in the chute and as a source of arc-quenching or deionizing gases. The plates of each group are suitably separated as by spacers 145 (Fig. 25) and held in position by bolts 140a. If the arc rises above plates 144, it is lengthened and split into a large number of arcs in series by the series of copper plates 147 spaced and insulated from each other in the top of the arc chute. These plates serve to quench, muffle, and chill the gases of the arc. Their construction and arrangement is similar to that disclosed and claimed in United States Letters Patent #2,030,582 to Graves.

To facilitate withdrawal of the arc chutes from the truck, each of them is provided (Figs. 4, 25 and 26) with a pair of plates 148 held to the sides 139 of the chute and having holes 149 in their upper ends to receive the ends of an inverted U-shaped link 150 suspended from and slidable along the guide bars 151 suitably attached to the under face of the top wall 46 of the truck structure. When the interpole barrier assembly 62 is in place, the links 150 rest upon the top wall 63 of the barrier assembly (Figs. 4 and 27), but when the barrier assembly is removed, the links 150 swing downwardly each above its associated arc chute 136 (Fig. 28) so that the lower ends thereof may be hooked into the holes 149 of the plates 148 of the arc chute.

To assist in alignment of the arc chutes 136, the rear upper end of each of them is received by the notch 152 in the plates 153 of insulation (Figs. 4 and 10) which project forwardly from the front face of the vertical wall 47 of the supporting frame for the contact structure of the circuit breaker.

All of the operating mechanism for the circuit breaker is supported from the under face of the horizontal wall 48 of the frame 51 and the only connections between the movable contact structures and their operating mechanism are the rods 154 which are of insulation; the upper end of each rod 154 is received by a coupling member 155 pivotally connected to the movable frame 103 for the movable contact structure of one pole of the circuit breaker and the lower end of each rod 154 is received by a coupling member 156 pivotally connected to an operating arm 157 (Figs. 4 and 29). All of the operating arms 157 are secured to shaft 158 supported intermediate its ends by a pair of split bearings 159 (Fig. 30), one on each of the side plates 162.

The coil 160 which may be energized to effect closure of the circuit breaker is within a housing 161 (Figs. 4 and 30) having two sides formed by steel plates 162 which are attached to and depend from the wall 48 of frame 51 and two sides formed by steel plates 163 which extend between, and secured, as by welding, to plates 162. Plates 162, in addition to serving as sides of the coil housing and as bearing plates for shafts of the operating mechanism, also provide feet upon which the circuit-breaker unit may rest when withdrawn from the truck.

The rear wall of the coil housing is formed by the steel plate 164 held in place by screws 165 which pass through plate 164 threadably to engage blocks 166 welded to the inner rear corners of the housing. The front wall of the coil housing comprises steel plate 167 welded in place and provided with an opening to receive the guide tube 168 of non-magnetic metal for the movable core or armature 169. The rear end of the guide tube which supports the coil 160 is received by a circular recess 170 in the rear wall 164 of the coil housing. The stop 171 for limiting the forward movement of the core 169 comprises a plate welded at its opposite ends to the plates 162 which are beyond the front wall of the coil housing. The core 169 is biased by spring 169a (Fig. 29) to its forward position.

The link 172 pivoted at its rear end to the front end of core 169 is provided with an elongated slot 173 which slidably receives the pivot pin 174 of the toggle links 175, 176. The upper end of toggle link 176 is pivotally connected by pin 177 to that one of the arms 157 which is attached to the central portion of shaft 158 between the plates 162 which support most of the circuit-breaker operating mechanism. The lower end of toggle link 175 is pivotally connected by pin 178 to a bell-crank lever 179 whose pivot pin 180 provides a fixed axis for angular movement of lever 179. The ends of pin 180 are supported by plates 162.

The arm 181 of lever 179 is engageable near its free end by the latching member 182 secured to shaft 183 and biased to its latching position by spring 184. When coil 185 of the tripping magnet 186 is sufficiently energized, as upon occurrence of an overload, the movement of its armature 187 through arm 188 rocks shaft 183 in counterclockwise direction to release the latch 182, whereupon powerful springs 189 (one of which is shown) rocks the shaft 158 to open the circuit breaker.

All of the stresses incident to opening and closure of the circuit breaker are confined to the frame 51 and are not transmitted from one operating part to another through the truck frame. Moreover, since the operating mechanism in its entirety is part of the circuit-breaker unit, it may readily be assembled and tested as a completely operative unit prior to mounting in the truck. Preferably the kinetic energy of the moving operating parts is absorbed by a friction brake B similar to that disclosed and claimed in United States Letters Patent No. 2,137,001.

The circuit breaker may be tripped manually by depressing the forward or handle end of lever 190 which is pivotally mounted within a housing or bracket 191 secured to the front end of the frame 51. The handle of lever 190, as shown in Figs. 1, 4 and 9, projects through a slot 190a in the door 44 of the truck. When the handle is depressed the extension 192 of lever 190 engages the extension 193 of latch 182 to effect its release from arm 181 and so permit springs 189 to open the circuit breaker.

The circuit breaker may be reclosed manually by inserting a bar 194 through an opening 195 (Figs. 1 and 9) in the truck door and into the slot 196 of a disk 197 loosely mounted, between the sides of bracket 191, on the shaft 198 (Fig. 29). A link 199 connects the disk 197 to the toggle pin 174. After the bar 194 is so inserted, it is swung downwardly through an arc of about 90° and so moves pin 174 to the left thus to rock the shaft 158 in clockwise direction to lift the rods 154 and so effect circuit-closing movement of the movable contacts of the circuit breaker. If an overload exists, the circuit-breaker cannot be held closed by bar 194 because when the latch 182 is released, the toggle collapses and springs 189 are free to open the circuit breaker regardless of the position of disk 197. The construction and operation of the operating mechanism is similar to that disclosed and claimed in Reissue Patent #19,753 to H. C. Graves.

Preferably, the edge of disk 197, which is visible through opening 195 in the truck door 44 is colored or otherwise marked to indicate whether the circuit breaker is in open or closed circuit position. The disk 197 is biased by spring 200 to the "open circuit" position so that it will move to that position when bar 194 is removed or released after tripping of the breaker during manual closure thereof. Spring 200 also restores the arm 181 to its latching position after tripping of the circuit breaker in readiness for the subsequent re-setting of the toggle incident to automatic or manual reclosure of the circuit breaker.

From the tripping lever 190 is suspended the rod 201 which extends through the base of the truck in line with the cam 31 on the base 30 of the switchboard to trip the circuit breaker, if it be closed, as the truck is pushed into the switchboard.

The bar 202 pivotally suspended from arm 151a on the operating shaft 158 of the circuit breaker is utilized to operate the auxiliary switches 203 mounted upon the panel 204 suitably mounted in the lower compartment of the truck. These switches may be used to operate signal lights or perform other control functions in accordance with the position of the circuit breaker.

Each truck unit B1—B6 is locked in its innermost or normal position by a pair of racking bars 205 (Fig. 4) each having a hooked end which drops over and engages the pin 206 of one of the pair of abutment members 28 attached to the front face of each of the switchboard units S1—S6; the rear face of the hooked end is suitably sloped so that if it is down when the truck is pushed into the switchboard the engagement of the sloping end with pin 206 causes the bar to lift and drop over the pin. The other end of each bar 205 is pivotally connected to a crank arm 207 secured to shaft 198 to which is secured the notched disk 208 accessible through the opening 195 in the door 44 of the truck. The ends of this shaft are supported in bearings 198a in brackets integral with frame 51, Fig. 10.

To release bars 205 from pins 206 and move the truck B to such extent from the switchboard unit S that all circuit connections between them are broken, the shaft 198 is rotated a half revolution from the position shown in Figs. 29 and 31a. To effect this movement, a bar or rod 194a is inserted in the notch 208A of disk 208 substantially in alignment with the stop 191a defined by the lower edge of housing 191 and then swung upwardly, through an arc of about 90°, until arrested by stop 191b defined by the upper edge of housing 191; the bar 194a is then removed and reinserted in notch 208b of disk 208 and again moved upwardly through an arc of somewhat less than 90°. Throughout substantially all of the resultant movement of cranks 207 effected by the two-step racking movement of bar 194a, the rear ends of the bars 205 remain in engagement with and press against the abutments 28 so that the counterclockwise rotation of the cranks 207 from the position shown in Fig. 31a to the 180° displaced position shown in Fig. 31a effects a forward movement of the truck B. Somewhat before completion of the 180° movement of cranks 207, the bars 205 rest intermediate their ends upon the abutments 209 so that further movement of the cranks in the same (counterclockwise) direction causes the bars 205 to pivot about the abutments 209 and so lift their hooked ends free of the pins 206.

When the circuit-breaker unit B is in its normal or service position shown in Fig. 4, the disk 208 is in the position shown in Fig. 31a with its notch 208c receiving the upper end of the vertically slidable pin 210 which is pivotally mounted upon the manual tripping lever 190 biased to non-tripping position by spring 211. The notch 208c and notch 208d for the pin 210 are out of the plane of the notches 208a, 208b so that, except when the pin 210 is received by one or the other of notches 208c or 208d, it is impossible to close the circuit breaker. Before the circuit-breaker truck can be moved from the position shown in Fig. 4, and before disk 208 can be moved from the position shown in Fig. 31a to the 90° displaced position shown in Fig. 31b, the handle 190 must be depressed thus to insure the circuit breaker is open before the disconnect contacts 17 of the truck B separate from the disconnect contacts 12 of the switchboard.

To provide a "test" position in which the circuit breaker, while its main contacts are out of circuit with the bus conductors, can be operated by control circuits through the contacts 8, the disk 208 is provided with a flattened cam notch 208d into which the pin 210 of the trip lever 190 rides (Fig. 31c) as the disk 208 approaches the end of its aforesaid second 90° movement. Engagement of the pin 210 with the shoulder 212 can be felt by the operator who is thus informed the truck has reached the "test" position. In this position the circuit breaker can be opened and closed either automatically or manually, and operation of its parts observed without danger to the operator and without need completely to withdraw the truck from the switchboard.

With the circuit breaker truck in "test" position and the circuit breaker closed, the breaker must be tripped manually before the lever 194a can further be raised to complete the second 90° movement of the disk 208 (from the position shown in Fig. 31b to the position of Fig. 31d).

The disclosed construction of disk 208 and its relation to pin 210 also prevents the circuit breaker from being closed when the truck is moved from "test" position toward the switchboard to restore the circuit breaker to its service position and thus precludes completion of the bus to cable circuit when the disconnect contacts 17 and 23 of the truck engage the disconnect contacts of the switchboard. More particularly, when disk 208 is rotated in clockwise direction from Figs. 31c, "test" position, to Fig. 31a, "service" position, the cam face of slot 208d moves pin 210 downwardly and so effects tripping movement of lever 190.

To summarize, the interlock between the racking and tripping mechanisms prevents closure of the circuit breaker for truck positions intermediate the "service" and "test" positions, determines the "test" position during withdrawal of the truck from the switchboard, prevents accidental withdrawal of the truck from "test" position, and effects tripping of the circuit-breaker, if closed, as the truck is moved from "test" toward "service" positions.

What I claim is:

1. A circuit breaker comprising a frame including two panels disposed in angular relation to each other, contact structure comprising relatively movable contact members, means for supporting said contact structure from said frame within the angle defined by said panels comprising conductors extending through one of said panels, operating mechanism, means for supporting said mechanism from said frame, and an insulated operating member extending through the other of said panels from said operating mechanism to said contact structure to effect relative movement of said contact members.

2. A circuit breaker comprising a frame including two panels disposed substantially at right angles to each other, contact structure comprising relatively movable contact members, conductors extending through one of said panels for supporting the contact structure of the circuit breaker within the angle between the panels, operating mechanism, means for supporting said mechanism from the other of said panels, and an insulated operating member extending through said other of said panels from said operating mechanism to said contact structure to effect relative movement of said contact members.

3. A circuit breaker comprising a frame including two panels disposed in angular relation to each other, main contacts supported from one of said panels in the angle between the panels by conductors extending through said one of them, a movable contact for bridging said main contacts and supported from one of them, operating mechanism, means for supporting said mechanism from said frame, and an insulated operating member extending through the other of said panels mechanically to connect said operating mechanism to said movable contact.

4. A circuit breaker comprising two panels disposed in angular relation to each other, conductors extending through one of said panels for supporting contact structures of the circuit breaker within the angle defined by said panels and providing for external electrical connections to said contact structures, operating mechanism for the movable contact structure of said circuit breaker supported from the external face of the other panel, and an insulating operating member extending through said other panel for connecting said mechanism to said movable contact structure.

5. A circuit breaker comprising a frame including two panels disposed in angular relation to each other, main contacts within the angle between said panels spaced from one of said panels by sleeves of insulation, conductors passing through said one of said panels and said sleeves to provide for external connections to said contacts and to clamp said sleeves to said one of said panels, a movable contact adapted to bridge said main contacts, operating mechanism, means for supporting said mechanism from said frame, and an insulated operating member for said movable contact extending through the other of said panels from said operating mechanism.

6. A circuit breaker assembly removable as a unit from a switchboard comprising a frame having a vertical panel and a horizontal panel, disconnect contacts disposed to the rear of said vertical panel, main contacts disposed on the other side of said vertical panel, conductors extending through said vertical panel to connect said disconnect contacts to said main contacts and to support all of them upon said panel, a bridging contact pivotally mounted on one of said main contacts, an operating member therefor extending through said horizontal panel, and operating mechanism for actuating said operating member supported by and disposed below said horizontal panel.

7. A circuit breaker assembly removable as a unit from a switchboard comprising a frame having a vertical panel and a horizontal panel, disconnect contacts extending from the rear face of said vertical panel, main contact structure supported from the front face of said vertical panel, a movable contact adapted to bridge said main contacts, electromagnetic operating mechanism for said movable contact supported from the under side of said horizontal panel, and an insulated operating member extending from said mechanism through said horizontal panel to said movable contact.

8. An enclosed truck-type circuit breaker including a circuit breaker assembly removable as a unit from the truck housing and comprising a frame having a horizontal panel for dividing the interior of the truck housing into upper and lower compartments and a vertical panel forming part of the rear wall of the truck housing, disconnect contacts extending from the rear face of said vertical wall, main contact structure within said upper compartment supported from said frame, contact structure movable within said upper compartment to bridge said main contacts, operating mechanism for said movable contact structure supported within said lower compartment from the underside of said horizontal panel, and a connecting member extending through said horizontal panel to connect said movable contact structure to said operating mechanism.

9. An enclosed truck type circuit breaker including a circuit breaker assembly removable as a unit from the truck housing and comprising a frame having a horizontal panel for dividing the interior of the truck housing into upper and lower compartments and a vertical panel forming part of the rear wall of the truck housing, disconnect contacts extending from the rear face of said vertical wall, main contact structure within said upper compartment supported upon said frame, contact structure movable within said upper compartment to bridge said main contacts, operating mechanism for said movable contact structure supported within said lower compartment from the underside of said horizontal panel, a connecting member extending through said horizontal panel to connect said movable contact structure to said operating mechanism, and means operable from the front of the truck to actuate said operating mechanism.

10. A multi-pole circuit breaker assembly comprising a frame having a vertical panel and a horizontal panel, means for supporting the main stationary contact structure of each pole from said vertical panel in vertical alignment, a plurality of contacts each movable to engage the main contact structure of a pole of the circuit breaker, individual insulated operating members extending from said movable contacts through said horizontal panel to the other side thereof, and a common actuating member for said operating members disposed on said other side of said horizontal panel.

11. A multi-pole circuit breaker comprising two panels disposed in angular relation to each other, means for supporting the main stationary contact structure of each pole from one of said panels, an interpole barrier assembly removable as a unit from the circuit breaker and comprising panels coacting with said first-named panels to provide isolated compartments for the main contact structure of each pole, a plurality of contacts each movable within one of said compartments, and individual operating members for said movable contacts extending through the other of said first-mentioned panels into the respective pole compartments.

12. A multi-pole circuit breaker assembly comprising a frame having a vertical panel and a horizontal panel, means for supporting the main contacts of each pole from said vertical panel in vertical alignment, a plurality of contacts each movable to bridge the main contacts of a pole of the circuit breaker, individual insulated operating members extending from said bridging contacts through said horizontal panel to the other side thereof, and a common actuating member for said operating members disposed on said other side of said horizontal panel.

13. A multi-pole circuit breaker comprising two panels disposed in angular relation to each other, means for supporting the main contacts of each pole from one of said panels, an interpole barrier assembly removable as a unit from the circuit breaker and comprising panels coacting with said first-named panels to provide isolated compartments for the main contacts of each pole, a plurality of contacts each movable within one of said compartments to bridge the pole contacts therein, and individual operating members for said movable contacts extending through the other of said first-mentioned panels into the respective pole compartments.

14. A multi-pole circuit breaker comprising individual arc chutes and blow-out coils for the contact structure of each pole of the circuit breaker, and an interpole barrier assembly removable as a unit from the circuit breaker and independently of said arc chutes comprising panels defining cells each of which contains the contact structure of a circuit breaker pole and its associated arc chute and blow-out coil.

15. A truck-type multi-pole circuit breaker including a circuit breaker assembly removable as a unit from the truck and comprising the fixed and movable contact structure of the circuit breaker and the operating mechanism for said movable contact structure, and an interpole barrier assembly removable as a unit from the truck comprising panels defining cells each of which contains the contact structure of one pole of the circuit breaker.

16. A truck-type multi-pole circuit breaker including a circuit breaker assembly removable as a unit from the truck and comprising the fixed and movable contact structure of the circuit breaker and the operating mechanism for said movable contact structure, individual arc chutes for the contact structure of each pole of the circuit breaker, and an interpole barrier assembly removable as a unit from the truck comprising panels defining cells each of which contains contact structure of a circuit-breaker pole and its associated arc chute.

17. A truck-type circuit breaker including an assembly removable as a unit from the rear of the truck comprising a frame, main contact structure supported by said frame, operating mechanism for movable contact structure of said circuit breaker supported by said frame, and racking gear supported by said frame including means operable from the front of the truck, when said assembly is in position, to effect movement of the truck.

18. An enclosed truck-type circuit breaker including a circuit breaker assembly removable as a unit from the truck housing comprising a frame having a horizontal panel for dividing the interior of the truck housing into upper and lower compartments, and a vertical panel forming part of the rear wall of the truck housing, circuit-breaker contact structure supported within one of said compartments by conductors extending through said vertical wall, disconnect contacts mounted upon said conductors exteriorly of the truck, and operating mechanism for the movable contact structure within the other of said compartments supported by said horizontal panel and operable from the front of the truck.

19. A circuit breaker comprising a rigid frame including two supporting structures disposed substantially at right angles to each other and braced by interconnecting structure, contact structure including a movable contact member supported by said frame within the angle defined by said supporting structures, electrical terminals extending from said contact structure outwardly through one of said supporting structures, an operating member for actuating said movable contact member extending outwardly through the other of said supporting structures, and operating means supported by said other of said supporting structures externally of said angle for effecting actuation of said operating member.

20. A circuit breaker comprising a rigid metal frame including two metallic supporting structures disposed substantially at right angles to each other and faced within the angle formed by them with insulation, contact structure including a movable contact member within said angle, means for supporting said contact structure from said frame comprising terminal conductors extending outwardly through one of said supporting structures, operating means supported by the other of said supporting structures externally of said angle, and an operating member for said movable contact member extending outwardly through said other of said supporting structures to said operating means.

21. A stationary housing, contacts within said housing, a second housing movable toward and from said first housing, a circuit-controlling device within said movable housing, contacts for said device extending from said movable housing for engagement with said first-named contacts, and complementary structures comprised in said housings overlapping to prevent access to said second-named contacts during their engagement with said first-named contacts.

22. A truck type circuit breaker comprising guide members extending along opposite sides of the truck, and an assembly slidable along said guide members for removal from and insertion into the truck as a unit comprising a frame, circuit breaker contact structure, means for supporting said contact structure from said frame, mechanism for operating said contact structure, means for supporting said mechanism from said frame, racking gear operable from the front of the truck, when said assembly is in inserted position, to effect movement of the truck, and means for supporting said racking gear from said slidable frame.

WILLIAM M. SCOTT, Jr.